United States Patent
Nachmanson et al.

(10) Patent No.: US 7,284,235 B2
(45) Date of Patent: Oct. 16, 2007

(54) CREATION OF CONTENT VERSIONS USING CONTENT LAYERS

(76) Inventors: Lev Borisovich Nachmanson, 9690 169th Ave. NE., Redmond, WA (US) 98052; Margus Veanes, 212 154th Pl. SE., Bellevue, WA (US) 98007

( * ) Notice: Subject to any disclaimer, the term of this patent is extended or adjusted under 35 U.S.C. 154(b) by 826 days.

(21) Appl. No.: 10/687,099

(22) Filed: Oct. 15, 2003

(65) Prior Publication Data
US 2005/0086633 A1 Apr. 21, 2005

(51) Int. Cl.
*G06F 9/44* (2006.01)
(52) U.S. Cl. ............... 717/117; 717/123; 717/143; 717/114; 715/514; 715/511
(58) Field of Classification Search ............. 717/114, 717/115, 117, 123, 140, 143; 715/513–517, 715/907–911
See application file for complete search history.

(56) References Cited

U.S. PATENT DOCUMENTS

| | | | | |
|---|---|---|---|---|
| 6,122,648 | A * | 9/2000 | Roderick | 715/513 |
| 6,397,232 | B1 * | 5/2002 | Cheng-Hung et al. | 715/523 |
| 6,574,609 | B1 * | 6/2003 | Downs et al. | 705/50 |
| 6,605,121 | B1 * | 8/2003 | Roderick | 715/513 |
| 6,665,662 | B1 * | 12/2003 | Kirkwood et al. | 707/3 |
| 6,742,028 | B1 * | 5/2004 | Wang et al. | 709/223 |
| 6,781,609 | B1 * | 8/2004 | Barker et al. | 715/760 |
| 6,810,429 | B1 * | 10/2004 | Walsh et al. | 709/246 |
| 6,826,594 | B1 * | 11/2004 | Pettersen | 709/203 |
| 6,944,865 | B1 * | 9/2005 | Zurawski | 719/313 |
| 6,976,023 | B2 * | 12/2005 | Chen et al. | 707/9 |
| 7,035,620 | B2 * | 4/2006 | Ben-Efraim et al. | 455/412.1 |
| 7,043,490 | B2 * | 5/2006 | Choy et al. | 707/101 |
| 7,043,716 | B2 * | 5/2006 | Zimmer et al. | 717/107 |
| 7,082,455 | B2 * | 7/2006 | Hu et al. | 709/203 |
| 7,171,664 | B2 * | 1/2007 | Wang et al. | 718/100 |
| 7,240,323 | B1 * | 7/2007 | Desai et al. | 717/100 |

OTHER PUBLICATIONS

XML Conent Management Based On Object-Relational Database Technology, B. Surjanto et al, IEEE, May 2000, pp. 70-79.*
JAVA Look and Feel Design Guidelines Advanced Topics, 2001, pp. 152-154.*
Supporting Document and Data Views of Source Code, Michael L. Collard et al, ACM, 2002, p. 34-41.*
"MAILSAIL® Documentation Set", Aug. 26, 2002, 25 pages, downloaded from http://www.xidak.com/mailsail/documentation_set_1630_html/docset-start.html.
Gatner, Susan and Paris, Jon, "iSeries EXTRA: Using Conditional Compiler Directives", Nov. 2001, 4 pages.
Ciletti, Michael D., "Compiler Directives", Copyright 2002, 4 pages.
"Compiler Directives", 29 pages, downloaded on Jun. 26, 2004 from http://courses.cs.vt.edu/~cs3304/FreePascal/doc/prog/node3.html.

* cited by examiner

*Primary Examiner*—Todd Ingberg

(57) ABSTRACT

The technologies allow a digital content developer to define, and a user to switch between or select, various versions of digital content for purposes of displaying, rendering, improving, or testing digital content. For example, a source code developer inserts identifiers in source code, and a source code layer viewer displays code segment choices defined by the identifiers. A user (e.g., the developer or others) selects code segments for inclusion in a source code version. The technology is also useful for providing versions of media content such as audio, video, DVD, images, text, etc.

19 Claims, 14 Drawing Sheets

```
class Source
  ToString(source as Source, codeLayer as CodeLayer) as String
    var s as String=""
    step foreach node in source.codeNodes        802
      s+=ToString(node,codeLayer)
    step
      return s                          804    806

ToString(codeNode as CodeNode ,codeLayer as CodeLayer) as String
    match codeNode
      simpleNode as SimpleCodeNode:
        return simpleNode.code
                                         808
      node as HighLowCodeNode:
                                    810
        let activeNodes=if node in codeLayer.highNodes
                          node.highNodes
                        else                  812
                          node.lowNodes
        var s as String=""
        step foreach node in activeNodeSeq
          s+=ToString(node,codeLayer)
        step                       814
          return s
```

```
class CodeNode  ← 602 class SimpleCodeNode extends CodeNode  ← 604
    code as String  ← 606 class HighLowCodeNode extends CodeNode  ← 608
    highNodes as Seq of CodeNode  ← 610
    lowNodes  as Seq of CodeNode  ← 612
```

```
class Source
    codeNodes as Seq of CodeNode  ← 702
    codeLayer as CodeL  ← 704
```

```
class Source
  ToString(source as Source, codeLayer as CodeLayer) as String
      var s as String=""                                          802
      step foreach node in source.codeNodes
          s+=ToString(node,codeLayer)
      step                                    806
          return s         804

ToString(codeNode as CodeNode ,codeLayer as CodeLayer) as String
    match codeNode
      simpleNode as SimpleCodeNode:
          return simpleNode.code
                                      808
      node as HighLowCodeNode:
                                   810
          let activeNodes=if node in codeLayer.highNodes
                          node.highNodes
                          else                  812
                          node.lowNodes
          var s as String=""
          step foreach node in activeNodeSeq
              s+=ToString(node,codeLayer)
              step                              814
                return s
```

```
//Macro section - optional
%macro
{whiteSpace}      '[ \t]*';

%expression Main
/'[\n]'                %ignore;
'.*\n'    LINE  , 'Line' ;
'{whiteSpace}#codenode{whiteSpace}\r?\n'         NodeStart,
'NodeStartHighPassive';
'{whiteSpace}#codenodeend{whiteSpace}\r?\n'      NodeEnd,
'NodeEnd';
'{whiteSpace}#lowcode{whiteSpace}\r?\n'          LowCodeStart,
'LowCodeStart';

902
%production nodes

Nodes nodes -> ;
NodesNode nodes -> nodes node;
HighLowCodeNode node -> NodeStart nodes LowCodeStart nodes NodeEnd;
SimpleNode node -> LINE;
```

FIG. 11

```
enum Color
  Black
  White var Adj as Map of Vertex to Set of Vertex={->}

DFSVisit(u as Vertex)
  if u.color=Color.White
    step
      u.color:=Color.Black
    step foreach v in Adj(u)
      if v.color=Color.White
        DFSVisit(v)
    step
      S:=[u]+S
codenodeend                            //end CN0 class Vertex
  key as Integer
  #codenode
  #lowcode                              //begin CN2
    var color as Color=Color.White
  #codenodeend                          //end CN2 step foreach j in [1]
    step
      topsort()
    step
      WriteLine(S)
      S := []
  catch
    e as Exception:
      WriteLine("Graph is cyclic.")

#codeLayer {CN0, CN1, CN2}
```

Labels: 1014, 1102, 1104, 1106, 1108, 1110, 1112, 1114, 1116, 1100

FIG. 12

```
var V as Set of Vertex
var E as Set of (Vertex,Vertex)    1202
var S as Seq of Vertex = []

topsort()
  S:= any s|s in AllPermutations(V) where
      foreach i in Indices(s), j in Indices(s)
        holds if i<j then (s(j),s(i)) notin E AllPermutationsOfS(S as Set of Vertex) as Seq of Seq of Vertex
  let seq = ToSeq(S)
  if S = {}
    return [[]]
  else
    var ret as  Seq of Seq of Vertex=[]
    step foreach s in S
      step foreach s1 in AllPermutationsOfS(S-{s})
        let t=[s]+s1
        ret:=ret+[t]
    step
      return ret class Vertex           1204
  key as Integer step foreach j in [1]
    step
      topsort()
    step
      WriteLine(S)                  1206
      S := []
  catch
    e as Exception:
      WriteLine("Graph is cyclic.")
```

```
var V as Set of Vertex
var E as Set of (Vertex,Vertex)
var S as Seq of Vertex = []

topsort()

step until fixpoint
    let X = V - ToSet(S)
    if X <> {} then
      S := S + [(any v | v in X where not(exists u in X where E(u,v)))]

class Vertex
  key as Integer step foreach j in [1]
      step
        topsort()
      step
        WriteLine(S)
        S := []
    catch
      e as Exception:
        WriteLine("Graph is cyclic.")
```

```
var V as Set of Vertex
var E as Set of (Vertex,Vertex)
var S as Seq of Vertex = []

topsort()
  step foreach v in V
    Adj(v):={}
  step foreach (u,v) in E
    Adj(u):=Adj(u)+{v} step foreach v in V
    DFSVisit(v)

enum Color
  Black
  White var Adj as Map of Vertex to Set of Vertex={->}

DFSVisit(u as Vertex)
  if u.color=Color.White
    step
      u.color:=Color.Black
    step foreach v in Adj(u)
      if v.color=Color.White
        DFSVisit(v)
    step
      S:=[u]+S class Vertex
  key as Integer
  var color as Color=Color.White step foreach j in [1]
    step
      topsort()
    step
      WriteLine(S)
      S := []
  catch
    e as Exception:
      WriteLine("Graph is cyclic.")
```

CREATION OF CONTENT VERSIONS USING CONTENT LAYERS

TECHNICAL FIELD

The technical field relates to a computerized method of defining alternative available segments in digital content, and switching between alternative segments in versions of digital content.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Programs normally undergo significant alterations during development. As a program develops, programmers often think of alternate ways to perform certain functions in a program. For example, a programmer may start with a basic sort function, only to learn later that although the basic function performs its intended function, the program is inefficient because the basic version of the function is inefficient.

Program developers introduce alternate versions of the function by cutting out the old code and pasting in the new code. The program is compiled again using the new code and tested for efficiency. Several iterations of new code may be developed before the program performs as desired.

Once a program is developed, or throughout the development process, the program is tested in order to determine whether the program performs as expected. Often source code is introduced into a program under test in order to determine the internal state of a process. One way to test or debug a program is to include "write" statements in the source code that write variables of interest to a file or the screen. Thus, the source code may have certain functions that are useful for testing, but must not execute upon program release. A developer removes these statements from the source code before a final compilation.

BRIEF SUMMARY

The described technologies provide methods and systems for allowing a digital content developer or user to switch between various versions of digital content for purposes of displaying, rendering, improving, or testing digital content.

One example provides identifiers for indicating code segment choices. A source code developer inserts these identifiers in source code, and a source code layer viewer displays segment choices. A graphical interface is used to select a desirable code segment choice for a given source code version.

In another example, the source code is displayed with a default code segment, and an event such as cursor movement over the default segment displays a code segment alternative for the default code segment.

Another example provides a source code file with plural code layer choices, where each choice represents two or more code segments selectable for each code layer choice.

In one such example, a code segment selection in one code layer choice automatically causes a code segment selection in another code layer choice.

In one example, a failure to make a code segment selection for a code layer choice causes a default code segment. In another example, upon selecting a code version icon, default and/or selected code layer choices are imported into a source code version. In one example, the source code version is compiled and tested. Optionally, different versions of the source code are created. If desirable, multiple versions are tested and compared.

One example provides identifiers for indicating content segment choices. A content developer inserts these identifiers in the digital content, and a content viewer displays a content selection criteria. Upon receiving an indication of the content selection criteria, common content is rendered along with content selected according to the indicated content selection criteria.

Additional features and advantages will be made apparent from the following detailed description of the technologies, which proceeds with reference to the accompanying drawings.

BRIEF DESCRIPTION OF THE DRAWINGS

FIG. 6 is a program listing of an exemplary model of code layers.

FIG. 7 is a program listing of an exemplary model of a source code file or data structure.

FIG. 8 is a program listing of an exemplary model of a ToString method for creating or displaying a source code version.

FIG. 9 is a program listing of an exemplary grammar for a CodeNode language implemented by a grammar parser.

FIG. 11 is a continuation of the program listing of FIG. 10.

FIG. 12 is a program listing of a source code version of code layers selected from FIGS. 10-11.

FIG. 13 is a program listing of a source code version of code layers selected from FIGS. 10-11.

FIG. 14 is a program listing of a default source code version of code layers.

DETAILED DESCRIPTION

Figure 1:
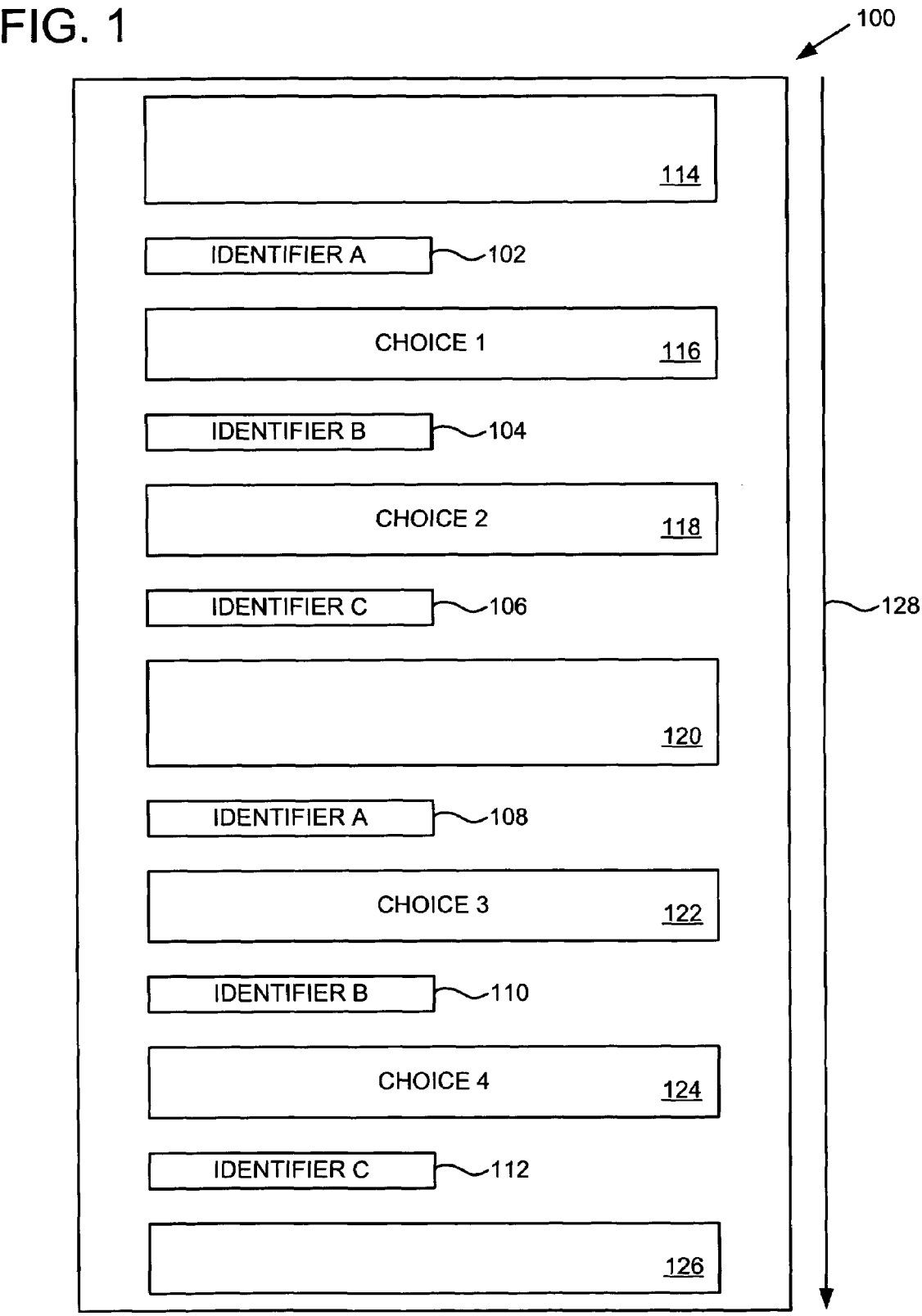
FIG. 1 is a source code file with exemplary code layer identifiers defining code layer boundaries.

FIG. 1 is a diagram representing a source code file 100 with exemplary code layer identifiers defining code segment boundaries. In one example, the source code is an input to a code layer viewer. A code layer viewer is a stand along program or a feature integrated into another program, such as an editor program or a source code management program.

In one such example, a code layer viewer receives the source code file 100 as input, and displays the source code on a computer terminal. While the source code is viewed on the display, a user is presented with code layer choices. In one example, as the user scrolls down the source code 128 using a mouse, keystroke, or other input device, the source code 114-126 is displayed to the user. As the user scrolls down the source code, the code viewer displays a segment of code 116, and allows the user to make a code layer choice.

In one such example, the code layer viewer displays a default code segment 116. However, if the user creates an input event (e.g., waiving a cursor over a displayed code segment), the code layer viewer will display an alternative code segment 118. A user can select the first code segment (e.g., choice 1) 116, or the second code segment (e.g., choice 2) 118. In one example, if a user fails to make a code layer choice, a default choice is made for the user.

In one example, the user scrolls further down the displayed source code and makes another code layer choice 122, 124.

As shown, a source code file includes an identifier 102 that identifies the beginning of a first code segment 116. Additionally, the source code file includes an identifier that identifies the beginning of a second code segment 104. A source code programmer signals source code segment choices by placing the identifiers in the source code. The intent of placing the identifiers is to signal to a code viewer to offer a source code choice. In this example, the second identifier 104 also identifies the end of the first code segment 116 and a third identifier 106, identifies the end of the second code segment 118.

In this source code file example 100, a source code file includes two code layer choices (e.g., choice 1 or 2, and choice 3 or 4). The code segments selectable by a user are defined using the identifiers. Namely, identifiers a, b, and c, 102-106, define the first code layer choice 116 or 118, and identifiers a, b, and c, 108-112, define the second code layer choice 122 or 124.

A user may select a code segment choice provided by the code viewer using a mouse click, a graphical toggle button, or many other ways. In another example, the user types a list of choices into the keyboard. Also, a default choice can be automatically provided for any choice not made by the user, or the user is individually prompted for any missed choices.

In this example, not all code segments represent code layer choices. For example, code before the first identifier 114, code between choices 120, and code after the last choice 126, is output in all source code versions.

In another example, there is a relationship between sets of choices. For example, a source code programmer may desire that choice 1 (116) be placed in the source code with choice 3 (122). In such a case, a selection of choice 1 will cause the automatic selection of choice 3, or vice-versa. This would be the case, for example, if choice 1 contained a source code class definition or other defining information that is required below for choice 3.

Finally, once the code viewer has displayed the source code, and choices are made, the code viewer outputs a version of source code containing the code layer choices. In one example, code segments eliminated by choice selections are deleted from the source code. In another example, code segments eliminated by choice selections are "commented out" of compilable code but remain in the source code. Various source code language compilers use various escape characters that can be automatically inserted in front of eliminated segment choices, so only the correct segment choices are seen by the compiler. The code layer selected source code is then ready to be compiled and executed.

Once a code layer selected source code version is executed, a user then optionally, selects, executes, and runs other versions of the source code. This is useful, for example, in comparing code segment performance or for debugging purposes.

By using identifiers defined for a code viewer feature, a source code programmer creates source code files that display code segment choices for selection, and various versions of code segments are selectable to create various source code arrangements.

Figure 2:
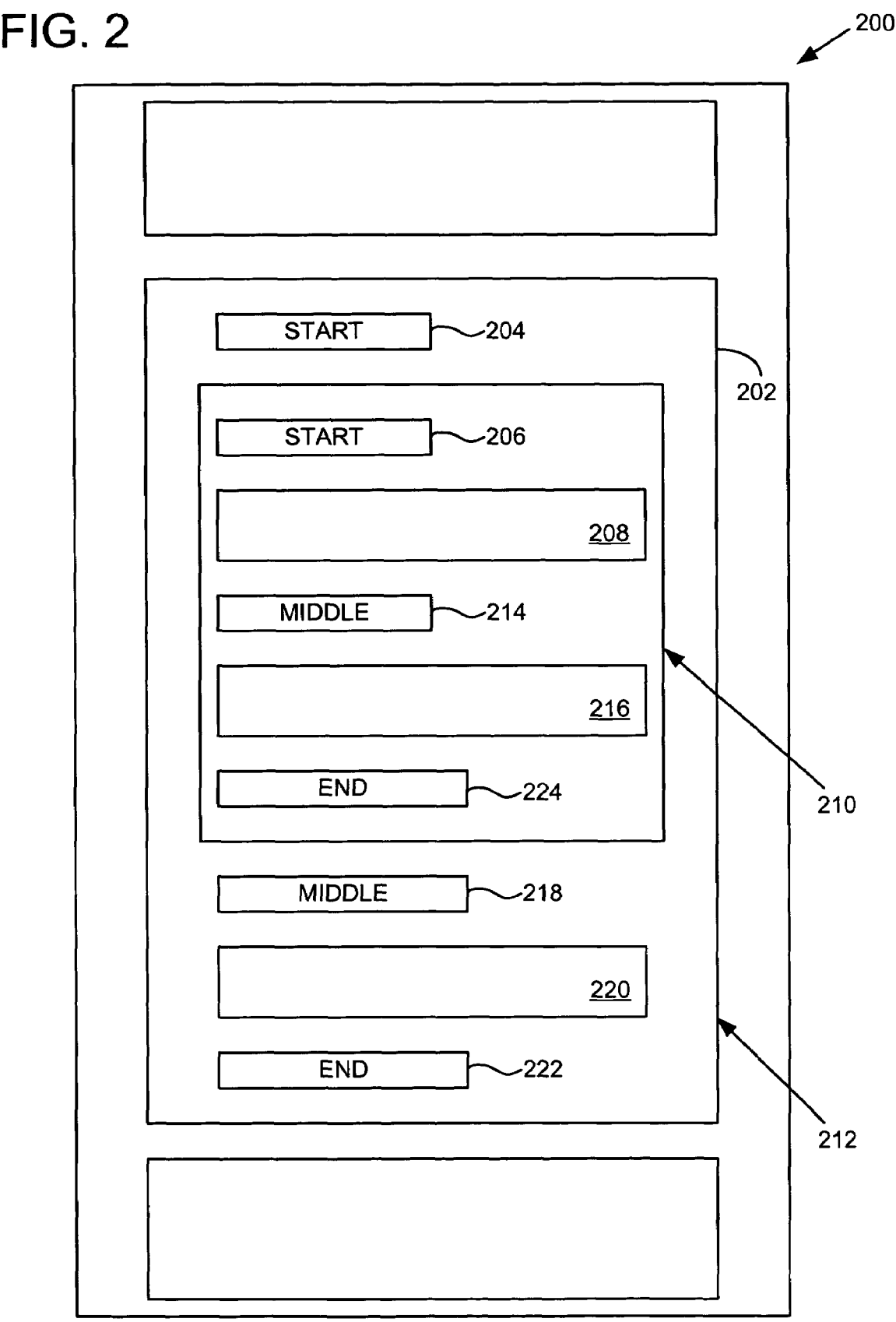
FIG. 2 is a source code file with exemplary nested code layer identifiers, identifying code segment boundaries.

FIG. 2 is a source code file 200 with exemplary nested code layer identifiers, identifying code segment boundaries.

In this example, a code layer node 202 is identifiable by a start identifier 204. The code following the start identifier can be either another code layer node or a code segment. In this case, the code following the first start identifier 204 is another code layer node that is identifiable by the second start identifier 206. As before, the code following the start identifier can be either another code layer node identifier, or a code segment. In this case, the code following the second start identifier 206 is a code segment 208. Thus, a code layer node 210 is nested within another code layer node 212. In this example, a middle identifier 214 follows the code segment 208. As with the start identifier, the code following a middle identifier can be either another code layer node or a code segment. In this case, a code segment 216 follows the middle identifier 214, and an end identifier 224 signals the end of the nested code layer node start 206. Finally, a code segment 220 follows the middle identifier 218 of the outside code layer node 212, and the end identifier 222 signals completion of the outside code layer node 212.

Thus, FIG. 2 demonstrates an exemplary binary tree structure for code layer nodes, whereby a node of the tree structure includes a left node before the middle identifier, and right node after the middle identifier. Additionally, the left and right nodes are also nodes that may contain nested left and right nodes therein, and so forth. Each node ends in another node, or a node segment. The start, middle, and end identifiers could also be assigned other names (e.g., identifier a, identifier b, and identifier c, respectfully).

Finally, each code layer choice could instead be identifiable in the source code as a list of selectable code segment choices for a given node in the source code. In one example, these code layer choices are stored as tree data structures.

Thus, identifier properties are defined and provided to a source code developer, and the source code developer uses the defined identifiers to define code segments to be presented by a code layer viewer according to the defined identifier properties.

Often, the source code developer will be the user of the code layer viewer that displays the code layer choices. As for other users, a source code developer can use the code layer viewer to swiftly and elegantly switch between and test various versions of the software based on various code segment choices made using the code viewer.

Figure 3:
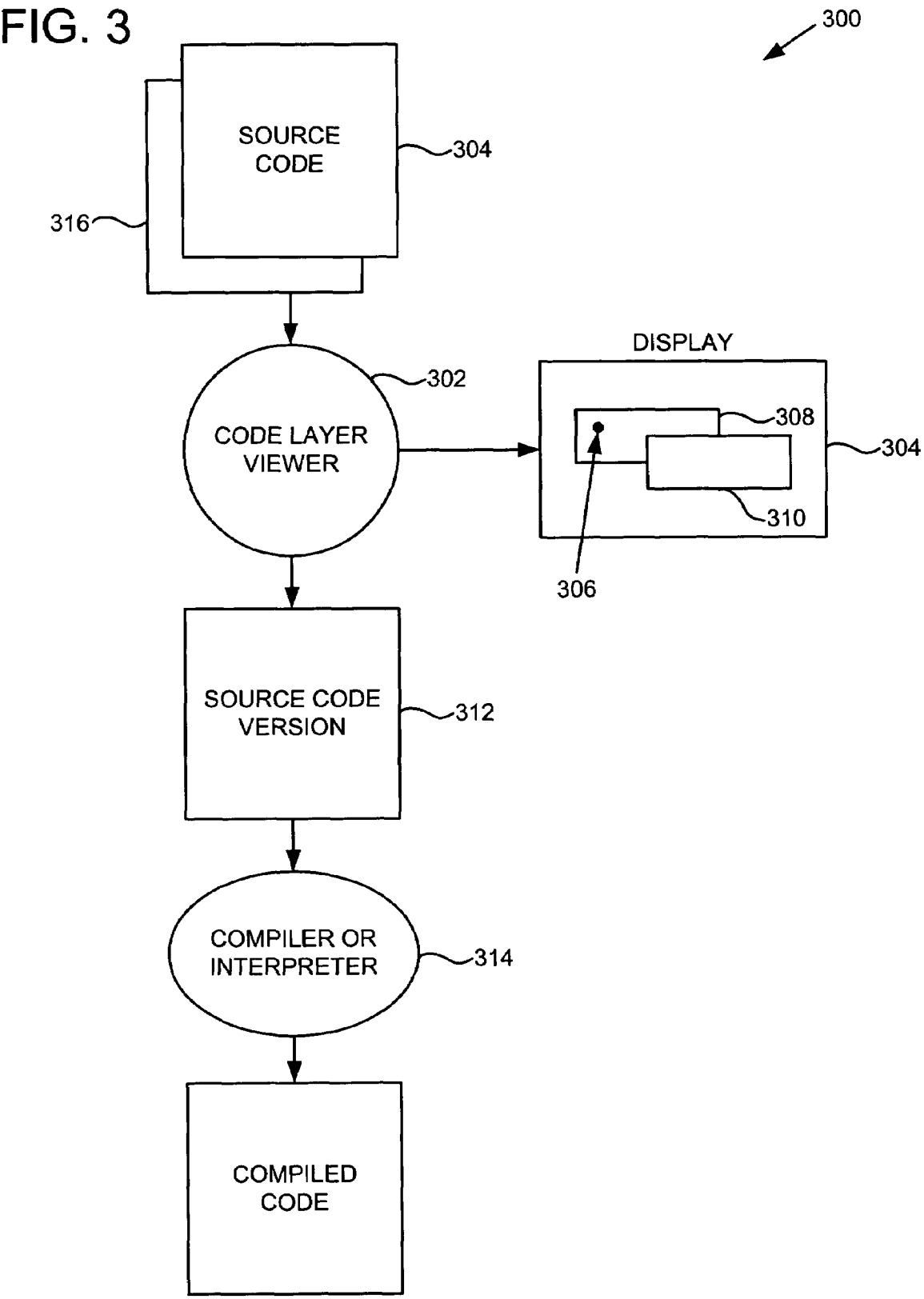
FIG. 3 is an exemplary diagram of a process using a code layer viewer to view or create a source code version.

FIG. 3 is an exemplary diagram of a process 300 using a code layer viewer to create a source code version.

In this example, a code layer viewer 302 receives source code as input 304. The source code includes identifiers of at least one code layer choice. The code layer choice is presented to a user on a computer display 304. In this example, when a user places a cursor 306 over a code segment 308, an alternative code segment 310 is displayed.

In this example, the user is presented with two code segments 308, 310, and the user makes a code layer choice by selecting either the first 308 or second 310 code segment.

In one example, the user selects the first or second code segment by placing the cursor over the desired code segment and right clicking on the mouse. In another example, the user is presented with a dialog box that identifies the code segments by name, and the user clicks the desirable code segment name on the dialog box.

A code layer choice represents two or more code segments, and a user selects one of the code segments to be used in a source code version 312. An input source code file may have one or more code layer choices that can be made by a user before the code layer viewer creates a source code version. Of course, one or more of the code layer choices can be made by default if no code segment selection is made by a user for that code layer choice. For example, for a code layer choice, the code layer viewer could select the first or last code segment as a default code segment when no choice is made by a user. Once a version 312 is created by a code layer viewer, the version is optionally compiled or interpreted 314, and tested for performance or debug purposes. After evaluating the performance of or debugging a version of the source code 312, a user may decide to create another version of the program for testing or debugging purposes. For this reason, and others, a copy of the source code 316 might be made to iteratively create other versions for test.

Figure 4:
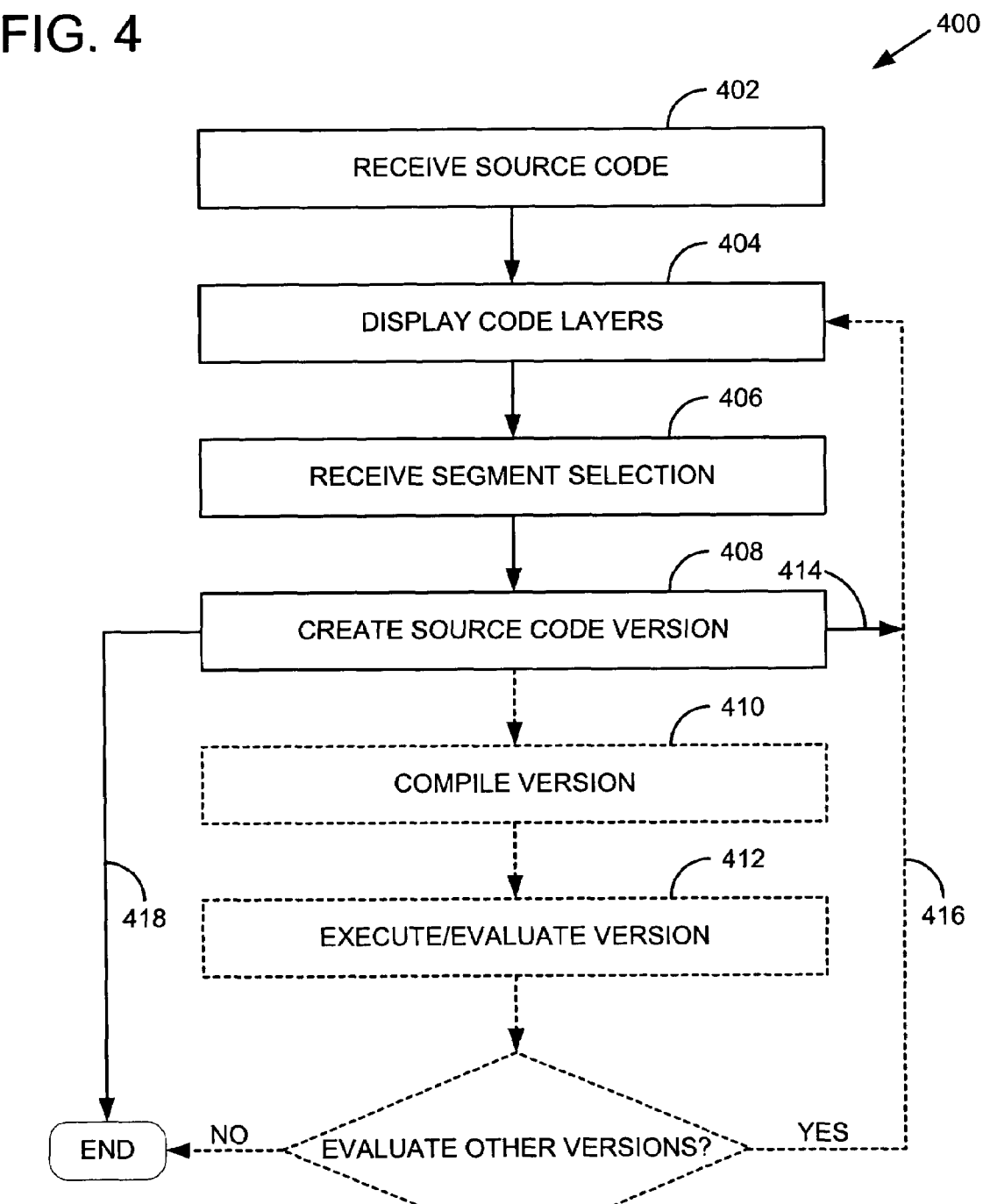
FIG. 4 is a flow chart of a process for displaying code layers and creating source code versions.

FIG. 4 is a flow chart of a process 400 for displaying code layers or creating source code versions.

In this example, a program receives a source code file as input 402. The source code 402 comprises code layer nodes with code segment choices, and identifiers defining code layer nodes and code segment choices. A code layer viewer receives the source code and parses the source code to display 404 the source code with code layer choices. A user viewing the displayed source code on a computer display, and using an input device such as a keyboard, laser pointer, and/or mouse, selects code segments. The code layer viewer receives the code segment selection inputs 406, and creates a version of source code containing the selected code segments 408.

Optionally, a user could create several source code versions 414 before compiling any of the versions 410. Additionally, a user could compile 410, execute and test 412 a created version, before returning to create another version for test 416. Finally, a user may decide to create and test only one version 418.

Finally, the source code 402 can be altered with additional code layer choices, or additional code segments in an existing code layer choice before displaying the updated source code for code layer selection 404.

The generation and selection of code layers can be an iterative growing process, and prior code segments often serve well as specifications to test whether later code segments perform according to a prior successful code segment that proved accurate, but not efficient.

Figure 5:
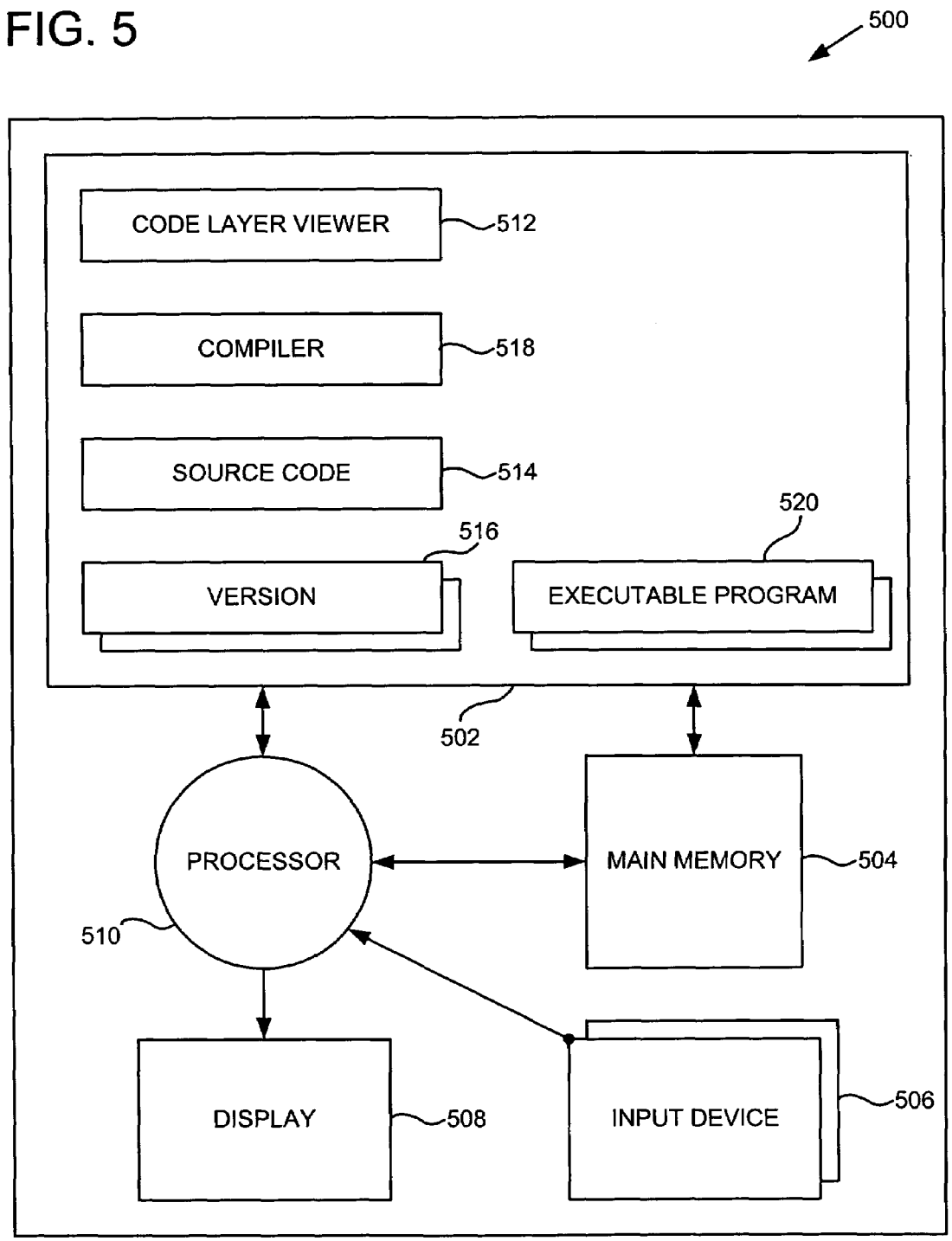
FIG. 5 is a block diagram of an exemplary computer system for performing code layer display and selection.

FIG. 5 is a block diagram of an exemplary computer system 500 for performing code layer definition, display or selection.

The exemplary system includes a hard drive memory 502 and main memory 504. Further, the system includes input devices 506, a display 508, and one or more processors 510 executing programs 512-520 transferred into main memory as needed for execution.

In this example, an editor or other source code management program includes a code layer viewer component feature 512. This program 512 receives source code as input 514.

The source code can be a file or class library that was created from scratch by the editor 512, or was altered from a template to create a source code file for input 514. The source code file includes code layer node identifiers that identify one or more code layer nodes including two or more code segments that can be selected. The code layer viewer displays the code layer node choices on the computer display 508, and a computer operator selects a code segment using an input device 506.

After one or more code layer node code segment selections are made, a source code version 516 is created by the editor program 512. If desirable, the source code version 516 is compiled 518 into an executable program or class library 520. If desirable, multiple source code versions containing various code segments are created 516 and compiled into various executable programs 520. These various programs are useful, for example, in running version performance comparisons.

FIG. 6 is a program listing 600 of an exemplary model of code layers.

In this example, code layers are defined according to a specification language called ASML, by Microsoft Corporation. As shown, a CodeNode class 602 is defined as either a SimpleCodeNode 604 which is a string of text 606, or a HighLowCodeNode 608 which is defined as a highNode, which is a sequence of one or more CodeNodes 610 and a lowNodes 612, which is a sequence of one or more CodeNodes.

Thus, a CodeNode is either a string 606, or an ordered pair 610, 612, whose first and second elements are themselves sequences of CodeNodes.

FIG. 7 is a program listing 700 of an exemplary model of a source code file or data structure. This exemplary model of source code is defined as a sequence of CodeNodes 702 of the CodeNode class defined in FIG. 6, along with a codeLayer 704; a codeLayer is a set of CodeNodes identifiers that identifies the code segments selected to occur in a source code version. Thus, CodeLayer controls how Source is mapped to string as shown in the ToString function defined in FIG. 8.

FIG. 8 is a program listing 800 of an exemplary model of a ToString method for creating or displaying a source code version. In this example, the first ToString method 802 receives the source code and a list of select code segment (e.g., codeLayer identifiers) as inputs, and builds a version (e.g., string) of the source code containing the selected code segments. As nodes are encountered in the source code, the second ToString function is called 804 in order to build up the version string. The method returns nodes containing text in the string 808, and for HighLowCodeNodes 608, 810, the method determines whether the node is listed in the codeLayer input 812, and if so, the highNode is the code segment placed in the version. Otherwise, the method defaults to using the low nodes. The method then calls ToString again on all nodes 814, which places text nodes in the string 808, or further traverses the HighLowCodeNodes 810. ToString continues in this fashion until a version is completed.

FIG. 9 is a program listing of an exemplary grammar 900 for a CodeNode language implemented by a grammar parser.

For example, to represent a text file as a sequence of code nodes, a CodeNode language is described in a grammar 902 that is reduced to a program for receiving the text file, identifying the nodes described by the grammar, and presenting the identified code layers for selection.

As shown, there are three tokens in the exemplary language: #codenode, #lowcode, and #codenodeend. The token #codenode denotes a HighLowCodeNode start, the token #codenodeend denotes a HighLowCodeNode end; and the text between the #codenode and the #lowcode is mapped to highNodes of the CodeNode. Text between #lowcode and #codenodeend is mapped to lowNodes of the CodeNode instance.

The CodeNodes can be nested, and text without token is mapped to SimpleCodeNode.

Figure 10:
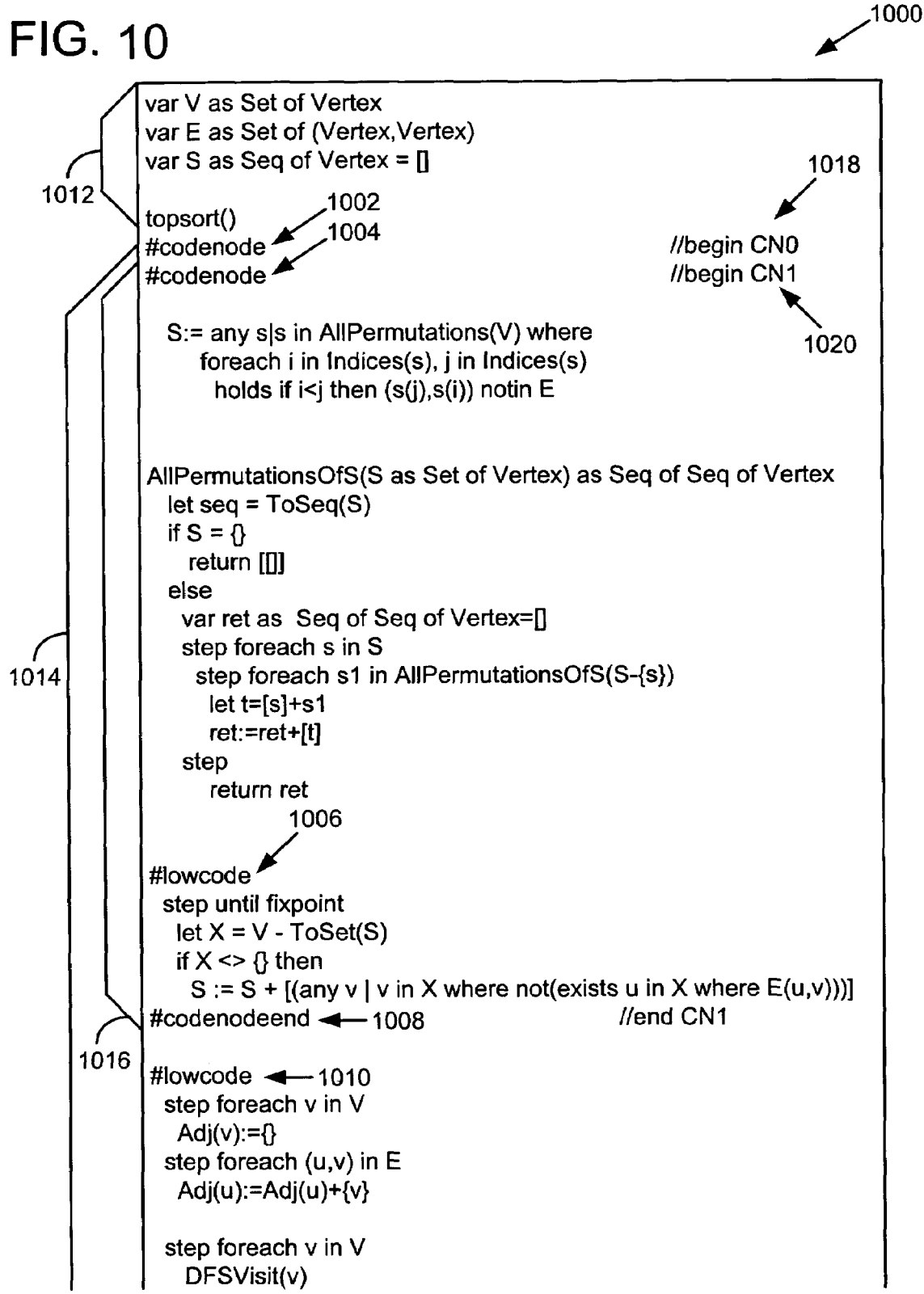
FIG. 10 is a program listing of source code containing exemplary codeNode identifiers defining code layers.

FIG. 10 is a program listing 1000 of source code containing exemplary codeNode identifiers defining code layers.

In this example, a codeNode identifier 1002 defines the beginning of a codeNode. The codeNode identifier 1004 immediately following the first codeNode 1002 indicates that the highNode 610 of the first codeNode 1002 is itself a HighLowCodeNode. Thus, the text above the lowNode 1006 identifier is the high code segment, and the text below the lowNode identifier 1006 is the low code segment for the nested codeNode 1004 identifier. The codeNode end identifier 1008 indicates the end of the nested codeNode 1004.

Interestingly, the nested HighLowCodeNode 1004, 1006, 1008 is also the highnode for the first codeNode 1002. Thus, lowNode identifier 1010 for the parent codeNode identifier 1002 identifies the beginning of the lowNode code segment for the parent HighLowCodeNode 1002.

FIG. 11 is a continuation of the program listing of FIG. 10.

The codeNode end identifier 1102 identifies the end of the lowNode code segment for the parent codeNode 1002. The codeNode identifier below the parent HighLowCodeNode 1002 identifies a next HighLowCodeNode in the source code sequence 702 of codeNodes. In this example, the high codeNode is an empty string 1104 since the node contains only a low node code segment 1106.

Thus, the source code represented by FIGS. 10 and 11 follows the source class defined in FIG. 7, which is a sequence of codeNodes 702. For example, FIG. 10 starts with a SimpleCodeNode string 604 identifiable in the source code as 1012. This simple code string is followed by a HighLowCodeNode identifiable in the source code as 1014. This HighLowCodeNode contains a nested HighLowCode-Node as its highNode 1016. A short simple code node follows 1108. The source code finishes with another HighLowCodeNode 1110 followed by another simple code node 1112.

As shown in FIG. 7, one example of a source code listing includes a codeLayer 704. Thus, if this example is followed, a #codeLayer token 1114 can include a listing of code segment selections.

If names are given to HighLowCodeNodes nodes of the text according to the order of tokens, the code nodes would be named CN0, CN1, and CN2, respectively 1018, 1020, and 1116. Again, the highNode of CN0 is CN1. Thus, an exemplary codeLayer string selecting code segments is represented at the bottom of the source code listing 1114. This string represents a way of defining a node layer selection in the input source code. The ToString method applied to this topological sorting produces a source code version shown in FIG. 12.

FIG. 12 is a program listing 1200 of a source code version of code layers selected from FIGS. 10 and 11.

In this example, code segments of the code layers are selected from a codeLayer identifier 1114 (CN0, CN1, CN2). For example, since CN0 is listed in the codeLayer, the highNode for CN0 is displayed in the version 1200. The highNode of CN0 is also a HighLowCodeNode, so the CN1 identifier in the codeLayers is an indication to select the highNode instead of the lowNode from CN1. The absence of CN1 from the codeLayer would indicate to use the lowNode from CN1. Finally, CN2 in the codeLayer indicates the selection of the highNode from CN2.

In one example, the codeLayer was populated manually by the source code developer simply by typing the identifier and node selections directly into the source code as shown 1114. In another example, when the source code is displayed in a code viewer, and node selections are made by clicking on a desired code segment with a mouse, the code viewer (e.g., editor) automatically populates the codeLayer string 1114. In other examples, the codeLayer (or another form of maintaining code segment selections) is kept in a separate data structure. Finally, it is instructive to note that simple text nodes outside of HighLowCodeNodes appear in the version 1202, 1204, and 1206 regardless of codeLayer selections.

FIG. 13 is a program listing 1300 of a source code version of code layers selected from FIGS. 10-11.

In this example, the codeLayers selected are (CN0, CN2). The CN0 selection indicates the highCode selection of CN0. Next, since CN1 is not in the codeLayer, the version defaults to the lowNode of CN1. Finally, the CN2 indicates the highNode from CN2. The resulting version is displayed in FIG. 13.

FIG. 14 is a program listing 1400 of a default source code version of code layers.

In this example, since no selection are in the codeLayer (i.e., {}), the lowNode is used for codeNodes.

Figure 15:
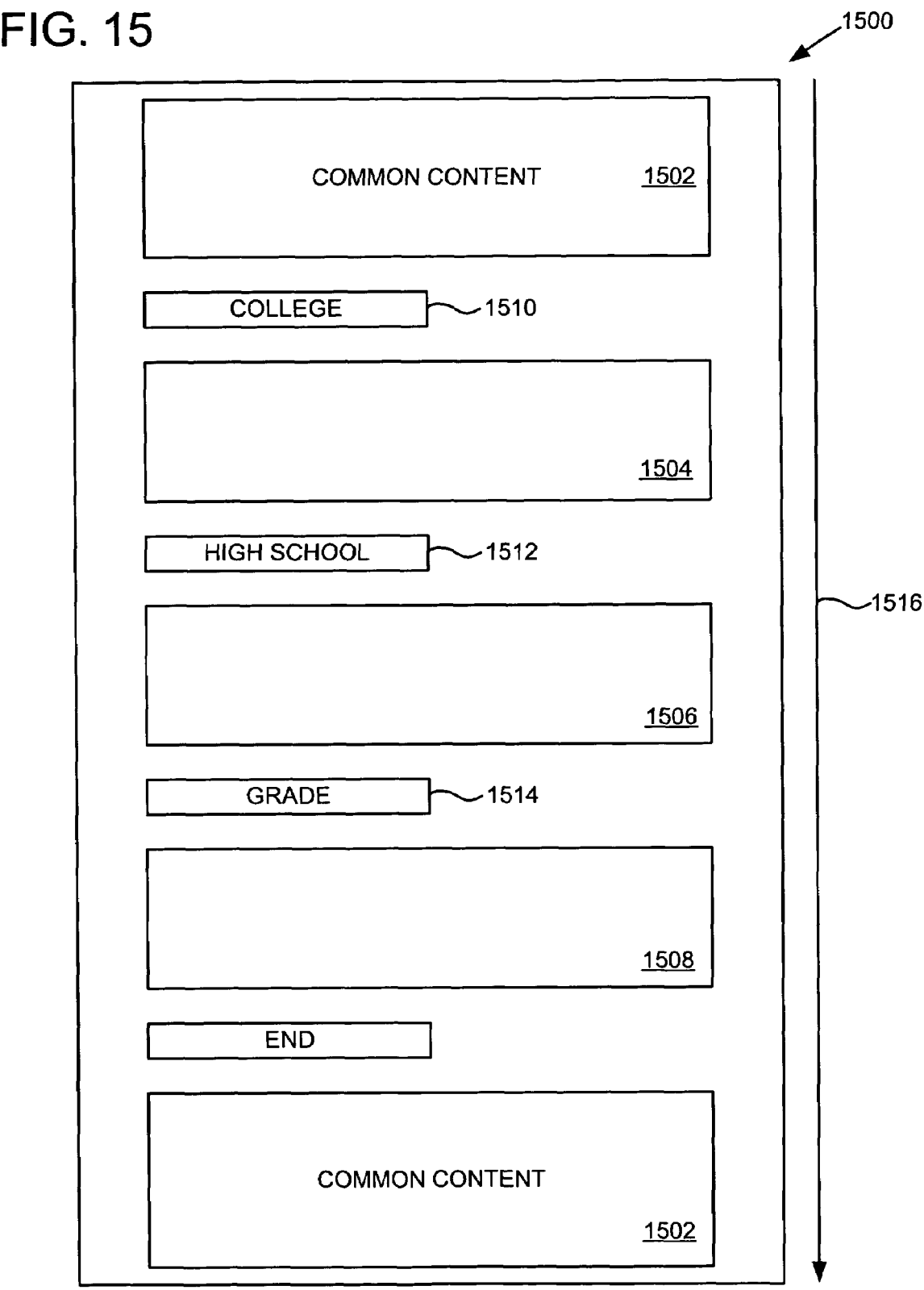
FIG. 15 is an exemplary digital media content file and content selection identifiers.

FIG. 15 is an exemplary digital media content file 1500 including content selection identifiers.

For example, digital media content is an audio file, a video file, an audio-visual file, a DVD, a web page with audio video content, streaming media file, etc. A code layer viewer is a program that plays common media content 1502 and media content 1504-1508 selected based on some selection criteria. In the example shown, media content is a DVD warning students about illicit drugs. A code layer viewer prompts a code layer viewer operator about the desired selection criteria identifier 1510-1514. For example, the selection criterion is a graphical window presented on a display inquiring about the viewing audience. In this example, assume the operator selects a grade school age audience via the presented graphical window. The media content plays the media content in order 1516 of the content listing. When a selection criterion 1510-1514 is encountered during playback, the code layer viewer displays the content 1508 intended for this audience (i.e., a grade school audience). The media content file may have several places where content is directed to the grade school audience instead of other audiences, whereas other parts of the content (common content) 1502 are presented regardless of the audience.

In other examples, the media content is varied based on a movie rating system. For example, the selection criteria identifiers are PG, PG13, or R. The media content is varied based on the desired movie ratings. For example, a theater plays the PG rating at matinee, the PG13 rating at the 7 p.m. show, and the R rating at the 9 p.m. show.

In another example, a media content is a book on CD, and the parts of the story are displayed based on the scientific understanding or emotional capacity of the viewer (e.g., selection criteria—{scientist, college graduate, or child}, or age group—{0-8 years of age, 8-14 years of age, etc.}.

COMPUTING ENVIRONMENT

Figure 16:
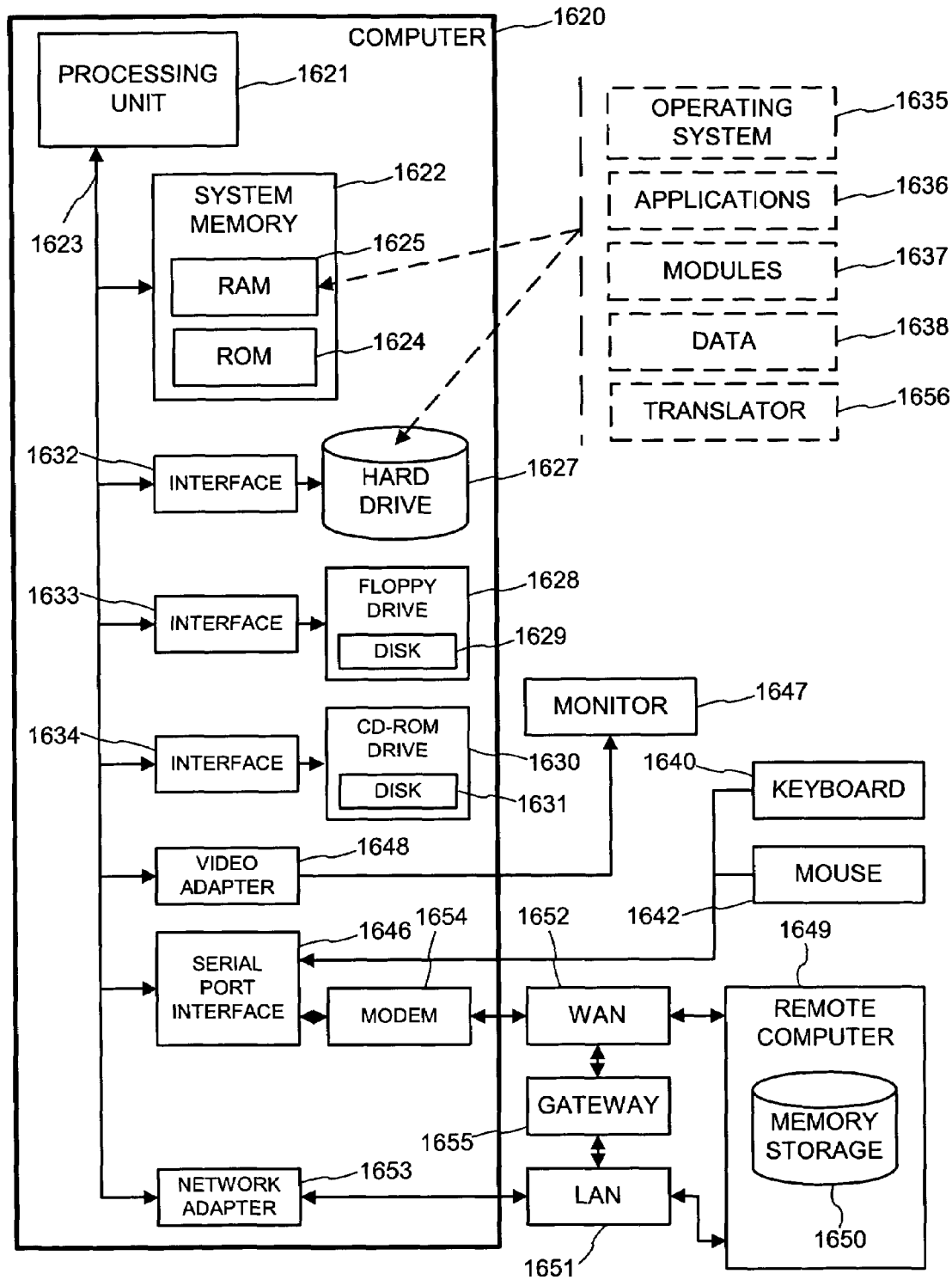
FIG. 16 block diagram of a distributed computer system implementing the described technologies.

FIG. 16 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 16, an exemplary system for implementation includes a conventional computer 1620 (such as personal computers, laptops, servers, mainframes, and other variety computers) includes a processing unit 1621, a system memory 1622, and a system bus 1623 that couples various system components including the system memory to the processing unit 1621. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1621.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1624 and random access memory (RAM) 1625. A basic input/output system (BIOS), containing the basic routines that help to transfer information between elements within the computer 1620, such as during start-up, is stored in ROM 1624.

The computer 1620 further includes a hard disk drive 1627, a magnetic disk drive 1628, e.g., to read from or write to a removable disk 1629, and an optical disk drive 1630, e.g., for reading a CD-ROM disk 1631 or to read from or write to other optical media. The hard disk drive 1627, magnetic disk drive 1628, and optical disk drive 1630 are connected to the system bus 1623 by a hard disk drive interface 1632, a magnetic disk drive interface 1633, and an optical drive interface 1634, respectively. The drives and their associated computer-readable media provide nonvolatile storage of data, data structures, computer-executable instructions, etc. for the computer 1620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1625, including an operating system 1635, one or more application programs 1636, other program modules 1637, and program data 1638; in addition to this technology 1656.

A user may enter commands and information into the computer 1620 through a keyboard 1640 and pointing device, such as a mouse 1642. These and other input devices are often connected to the processing unit 1621 through a serial port interface 1646 that is coupled to the system bus, but may be connected by other interfaces, such as a parallel port, game port or a universal serial bus (USB). A monitor 1647 or other type of display device is also connected to the system bus 1623 via an interface, such as a video adapter 1648. In addition to the monitor, computers typically include other peripheral output devices (not shown), such as speakers and printers.

The computer 1620 operates in a networked environment using logical connections to one or more remote computers, such as a remote computer 1649. The remote computer 1649 may be a server, a router, a peer device or other common network node, and typically includes many or all of the elements described relative to the computer 1620, although only a memory storage device 1650 has been illustrated. The logical connections depicted include a local area network (LAN) 1651 and a wide area network (WAN) 1652. Such networking environments are commonplace in offices, enterprise-wide computer networks, intranets and the Internet.

When used in a LAN networking environment, the computer 1620 is connected to the local network 1651 through a network interface or adapter 1653. When used in a WAN networking environment, the computer 1620 typically includes a modem 1654 or other means for establishing communications (e.g., via the LAN 1651 and a gateway or proxy server 1655) over the wide area network 1652, such as the Internet. The modem 1654, which may be internal or external, is connected to the system bus 1623 via the serial port interface 1646. In a networked environment, program modules depicted relative to the computer 1620, or portions thereof, may be stored in the remote memory storage device. It will be appreciated that the network connections shown are exemplary and other means of establishing a communications link between the computers may be used.

ALTERNATIVES

Having described and illustrated the principles of our invention with reference to an illustrated example, it will be recognized that the examples can be modified in arrangement and detail without departing from such principles. It should be understood that the programs, processes, or methods described herein are not related or limited to any particular type of computer apparatus. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computer readable medium containing source code comprising:

a first identifier indicating a first segment of source code;

the first segment of source code;

a second identifier indicating a second segment of source code; and the second segment of source code;

wherein the identifiers indicate to a source code viewer that a choice is displayed to select the first or second segments such that the source code viewer creates a version of source code using a selected segment of source code.

2. The computer readable medium of claim 1 wherein the first segment is a default version if no choice is made.

3. The computer readable medium of claim 1 wherein the second identifier further indicates the end of the first segment and the beginning of the second segment, and a third identifier indicates the end of the second segment.

4. The computer readable medium of claim 3 wherein source code above the first identifier is indicated as being in a version whether the first or second segments is in the version.

5. The computer readable medium of claim 1 wherein source code outside the identifiers indicates that source code outside the identifiers is in all versions.

6. A method comprising:

receiving a file comprising source code with code layer choice identifiers:

displaying the source code on a computer terminal comprising a code layer choice;

receiving an indication of a code layer choice; and creating a version of source code comprising the indicated code layer choice.

7. The method of claim 6 further comprising receiving the indication of the code layer choice via a code layer string in the source code.

8. The method of claim 7 further comprising transforming the version into compiled code.

9. The method of claim 6 wherein the code layer choice identifiers identify plural sets of code layer choices and the received indication indicates a code layer choice for at least one set.

10. The method of claim 6 wherein the code layer choice identifiers identify plural code layer choices, and at least one default code layer is used to create the version since the received indication fails to indicate a code layer choice for said at least one default code layer.

11. The method of claim 6 wherein the displayed code layer choice comprises a choice between a first code segment and a pop-up window comprising a second code segment.

12. The method of claim 11 wherein the indication of the code layer choice is received when a user clicks a mouse button while a cursor is over the pop-up window.

13. The method of claim 8 wherein the compiled version is executed.

14. The method of claim 8 wherein after the compiled version is executed, the source code is displayed again, another code layer choice indication is received, and a new version of source code is created.

15. The method of claim 6 wherein the file is saved in a tree data structure format comprising data nodes identifiable by the code layer choice identifiers.

16. A computer system comprising:

a memory comprising a code layer viewer component, a source code file comprising source code and code layer identifiers;

a display;

an input device; and a central processing unit coupled to the memory, the input device, and the display;

wherein the code lawyer viewer edits the source code file to create a version of the source code file that includes an indicated code segment choice.

17. The computer system of claim 16 wherein the central processing unit, while executing the code layer viewer component and displaying the source code file, receives via the input device an indication of a code layer choice defined by the code layer identifiers.

18. The computer system of claim 16 wherein the central processing unit executes a compiler program to turn the version of source code into an executable program.

19. A method comprising:

receiving a media content file comprising common content and plural media content alternatives;

displaying content selection criteria;

receiving an indication of a selected content selection criteria; and rendering media content comprising common content and a media content alternative indicated by the selected content selection criteria.

* * * * *

UNITED STATES PATENT AND TRADEMARK OFFICE
CERTIFICATE OF CORRECTION

PATENT NO. : 7,284,235 B2
APPLICATION NO. : 10/687099
DATED : October 16, 2007
INVENTOR(S) : Nachmanson et al.

It is certified that error appears in the above-identified patent and that said Letters Patent is hereby corrected as shown below:

Title Page,

Column 1 should include item (73) immediately after item (76) as follows:

-- Assignee: Microsoft Corporation, Redmond, WA (US) --

Signed and Sealed this

Eighth Day of April, 2008

JON W. DUDAS
*Director of the United States Patent and Trademark Office*